United States Patent [19]

Niessen et al.

[11] 4,148,452

[45] Apr. 10, 1979

[54] FILTERING TECHNIQUE BASED ON HIGH-FREQUENCY PLANT MODELING FOR HIGH-GAIN CONTROL

[75] Inventors: Frank R. Niessen; John F. Garren, Jr., both of Newport News, Va.

[73] Assignee: The United States of America as Represented by the Administrator, National Aeronautics and Space Administration, Washington, D.C.

[21] Appl. No.: 858,762

[22] Filed: Dec. 8, 1977

[51] Int. Cl.² .............................................. G05D 1/08
[52] U.S. Cl. ................................. 244/195; 244/17.13; 244/83 G; 318/585; 318/616; 364/434
[58] Field of Search ...................... 244/17.13, 178, 179, 244/181, 195, 83 E, 83 F, 83 G, 221, 228, 227; 318/580, 585, 616, 617; 364/424, 434

[56] References Cited

U.S. PATENT DOCUMENTS

| 3,221,229 | 11/1965 | Kezer | 244/195 |
| 3,283,229 | 11/1966 | Lindahl | 318/580 |
| 3,361,394 | 1/1968 | Pfersch | 244/195 |

Primary Examiner—Trygve M. Blix
Assistant Examiner—Reinhard J. Eisenzopf
Attorney, Agent, or Firm—William H. King; John R. Manning; Howard J. Osborn

[57] ABSTRACT

This invention is an improvement in aircraft control systems that utilize feedback motion sensors to generate a control signal to control the aircraft. The improvement consists essentially of a complementary filter comprising a simplified model of the aircraft, a high-pass filter, a low-pass filter and a summing amplifier. The control signal is applied to the simplified model of the aircraft which attempts to compute the vehicle response to the signal. This computed response is then fed into the high-pass filter to eliminate long-term errors in the calculated response, with the result that a good estimate of the high frequency content of the aircraft motion is obtained. In order to obtain a good estimate of the low frequency content of the motion a rate gyro signal is fed through the low-pass filter that eliminates all of the offending noise. The outputs from the high-pass and low-pass filters are summed by the summing amplifier to produce an estimated rate which is then used as a motion feedback signal. The use of the complementary filter permits a substantial increase in frequency band-width due to the simultaneous reduction in noise amplificaton and control limit-cycle tendencies.

10 Claims, 4 Drawing Figures

FILTERING TECHNIQUE BASED ON HIGH-FREQUENCY PLANT MODELING FOR HIGH-GAIN CONTROL

ORIGIN OF THE INVENTION

The invention described herein was made by employees of the United States Government and may be manufactured and used by or for the Government for governmental purposes without the payment of any royalties thereon or therefore.

BACKGROUND OF THE INVENTION

The invention relates generally to aircraft control systems and more specifically the use of a complementary filtering technique to increase the frequency bandwidth of an aircraft control system in a high vibration environment.

Advanced control techniques for aircraft rely on the use of high-gain feedback from motion sensors to achieve improved performance in terms of disturbance rejection and response compliance. A direct measure of the degree of success that can be realized in achieving these benefits is the closed-loop frequency bandwidth, which is a function of the maximum feedback gain that can be achieved. In practice, the feedback gain level is limited by either noise amplification or control limit cycle, or by a combination of both.

In high vibratory environments such as helicopters experience, excessive noise amplification occurs even for modest gain levels. The noise encountered in helicopters is associated primarily with rotor-induced vibration and, therefore, contains harmonics of the rotational frequency. The frequency content corresponding to one cycle per rotor revolution and to n cycles per revolution, where n represents the number of blades per rotor, is usually the most bothersome from a control feedback standpoint because the amplitude is large and the frequency is so low that the control actuators and control surface aerodynamics can respond. Attempts to eliminate this low-frequency noise by classical filtering techniques introduces significant lag, which aggravates the limit-cycle problem, thereby requiring reduction in the feedback gain level. For feedback control applications where low gains can provide acceptable performance, such as in stability augmentation systems, classical filtering techniques are usually adequate. For the implementation of model-following and other control concepts requiring achievement of high-gain feedback, however, the situation has been less than satisfactory, with a severe operating compromise among noise, limit cycle, and performance.

It is therefore the primary object of this invention to increase the feedback gain that can be achieved in control techniques for aircraft.

Another object of this invention is to increase the feedback gain that can be achieved in model-following aircraft control techniques.

A further objective of this invention is to increase the resistance to external disturbances in aircraft control techniques.

Still another object of this invention is to use complementary filtering in aircraft control techniques to increase the control system frequency bandwidth due to simultaneous reduction in noise amplification and control limit-cycle tendencies.

Other objects and advantages of this invention will become apparent hereinafter in the specification and drawings.

SUMMARY OF THE INVENTION

The essential component of this invention is a complementary filter comprising a simplified model of the aircraft, a high-pass filter, a low-pass filter, and a summing amplifier. A signal proportional to control surface motion is fed to the simplified model of the aircraft which attempts to compute the aircraft response to the signal. This computed response is then fed to the high-pass filter to eliminate long-term errors in the computed response, with the result that a good estimate of the high frequency content of the aircraft motion is obtained. The output signal from a rate gyro attached to the aircraft is fed to the low-pass filter to eliminate all of the offending noise. The output of the low-pass filter which is a good estimate of the low frequency content of the motion is summed with the output of the high-pass filter by the summing amplifier. The time constants of the high-pass and low-pass filters are matched so that the sum of their outputs is an estimated angular rate signal. This estimated angular rate signal is then used as a motion feedback signal.

DETAILED DESCRIPTION OF THE DRAWINGS

Figure 1:
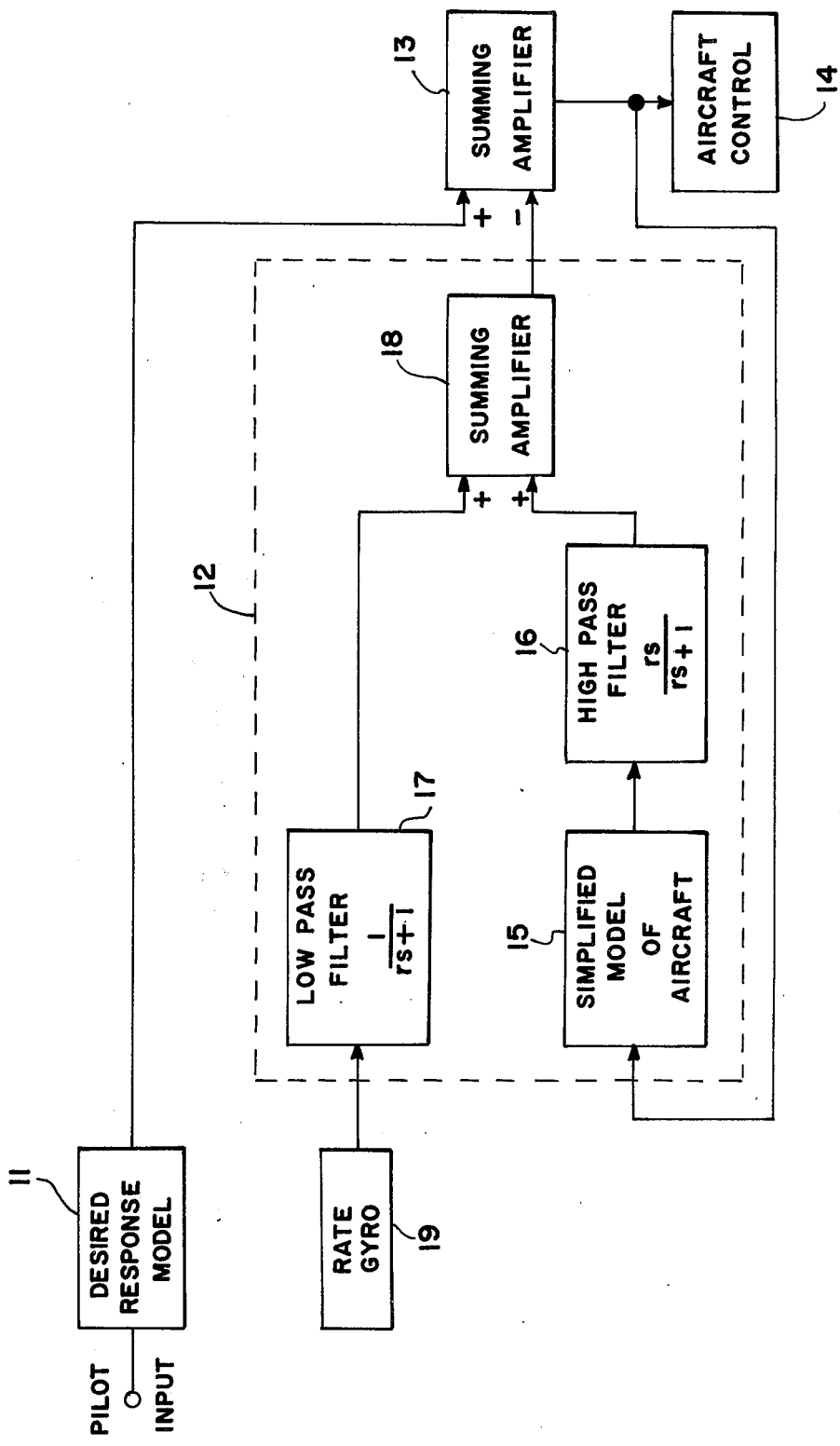
FIG. 1 is a block diagram showing the preferred embodiment of the invention used in a simple aircraft control system.

Turning now to an embodiment of the invention selected for illustration in the drawings the number 11 in FIG. 1 designates a desired response model which produces the desired signal in response to the pilot's input. The pilot input is an electrical signal indicative of his actions to control the aircraft and can be derived from, for example, a potentiometer attached to the controls. The difference between this desired response signal and a signal from a complementary filter 12 is obtained by summing amplifier 13 to produce an error signal that is fed to an aircraft control 14 to control the motion of the aircraft. Complementary filter 12 comprises a simplified model of the aircraft 15, a high-pass filter 16, a low-pass filter 17 and a summing amplifier 18. The output signal from summing amplifier 13 is applied to simplified model 15 which attempts to compute the aircraft response to the signal. This computed response is then fed to high-pass filter 16 to eliminate long-term errors in the computed response, with the result that a good estimate of the high frequency content of the aircraft motion is obtained. In order to obtain a good estimate of the low frequency content of the motion, the output signal from a rate gyro 19 attached to the aircraft is fed through low-pass filter 17 which eliminates all of the offending noise from the signal. The time constants of the two filters are matched so that the sum of their outputs is a perfect angular rate signal. The output of summing amplifier 18 which is an estimated rate is then
} used as a feedback signal by subtracting it from the desired response signal from model 11 by means of summing amplifier 13.

It is necessary that the time constants, $r_1$ and $r_2$, of filters 16 and 17 be identical in order to satisfy the requirement that the net effect of the two filters is an uncontaminated rate output. That this is true is demonstrated as follows: using the rule for summing transfer functions that are in parallel, the transfer function, F(s), that represents the combined effect of filters 16 and 17 becomes:

$$F(s) = \underbrace{\frac{r_1 s}{r_1 s + 1}}_{\text{Filter 16}} + \underbrace{\frac{1}{r_2 s + 1}}_{\text{Filter 17}}$$

If $r_1 = r_2$, the above equation becomes:

$$F(s) = r_1 s + 1 / r_1 s + 1 = 1$$

Hence, for this condition of identical values for r, the complementary filter acts as a unit transfer function insofar as the basic signal is concerned and contributes no dynamics to the system.

Figure 2:
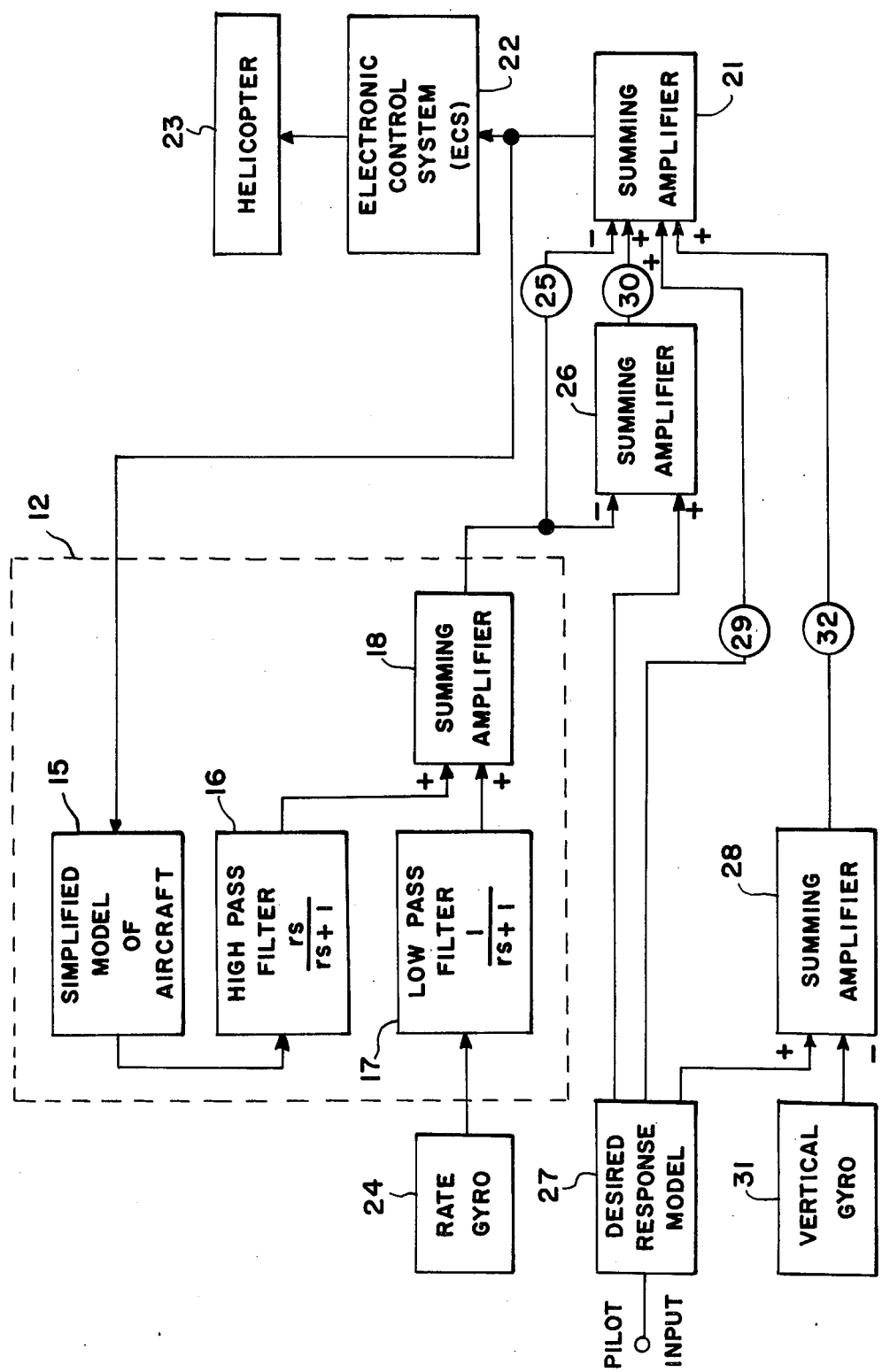
FIG. 2 is a block diagram showing the preferred embodiment of the invention in a more complex aircraft control system than that disclosed in FIG. 1.

A simplified block diagram of the model following control system for which the complementary filter 12 was developed is shown in FIG. 2. Although similar systems can be used for the pitch and yaw degrees of freedom, only the roll degree of freedom system is shown in FIG. 2.

The control signal at the output of a summing amplifier 21 is applied through an electronic control system 22 to control a helicopter 23. The control signal is also applied to the simplified model of the aircraft 15 which produces a signal proportional to the calculated roll rate. This calculated roll rate signal is passed through the high-pass filter 16 to summing amplifier 18. The output signal from a rate gyro 24 which is proportional to the aircraft roll rate is passed through the low-pass filter 17 and then added to the calculated roll rate by summing amplifier 18. The output signal from summing amplifier 18 which is proportional to the aircraft estimated roll rate, is applied to a summing amplifier 26 and through a potentiometer 25 to summing amplifier 21. A desired response model 27 produces three output signals in response to the pilot's input. These three signals are proportional to the aircraft roll attitude, the aircraft roll rate and the aircraft roll acceleration. The aircraft roll attitude signal is applied to a summing amplifier 28, the aircraft roll rate signal is applied to summing amplifier 26 and the aircraft roll acceleration signal is applied through a potentiometer 29 to summing amplifier 21. The output of summing amplifier 26, which is a signal proportional to the estimate roll rate error, is applied through a potentiometer 30 to summing amplifier 21. The output from a vertical gyro 31, which is a signal proportional to the aircraft roll attitude, is applied to summing amplifier 28. The signal at the output of summing amplifier 28 is proportional to the actual roll attitude error and is applied through a potentiometer 32 to summing amplifier 21.

Figure 3:
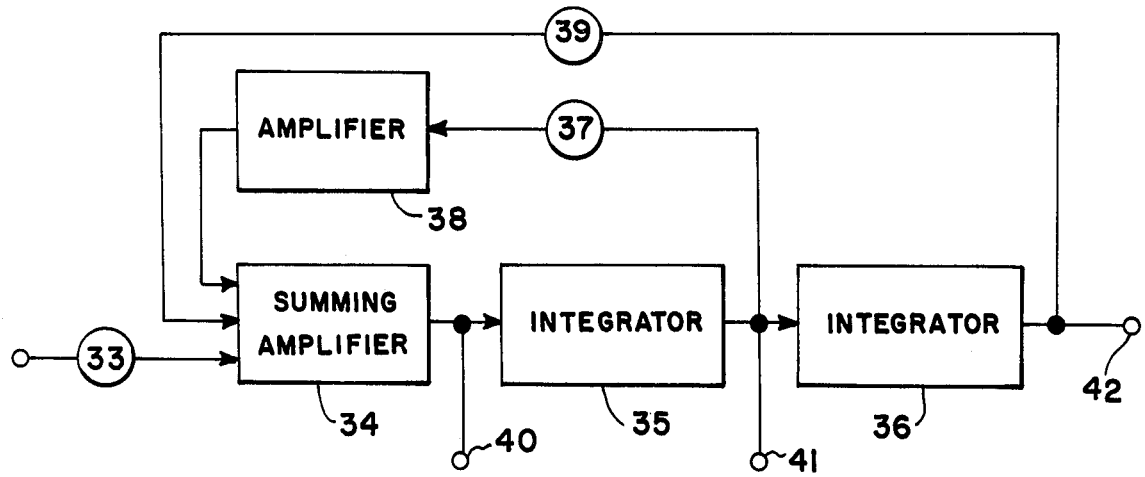
FIG. 3 is a block diagram of the desired response model diclosed in FIG. 2.

A model suitable for use as the desired response model 27 in FIG. 2 is disclosed in FIG. 3. The pilot input is applied through a potentiometer 33 to a summing amplifier 34. The output of the summing amplifier 34 is integrated by an integrator 35 the output of which is again integrated by an integrator 36. The output from integrator 35 is applied through a potentiometer 37 and an amplifier 38 to summing amplifier 34. The output from the integrator 36 is applied through a potentiometer 39 to summing amplifier 34. The resulting output of integrator 36 is proportional to the aircraft commanded roll attitude which is connected at terminal 42 to summing amplifier 28 in FIG. 2. The output of integrator 35 is proportional to the aircraft commanded roll rate and is applied through terminal 41 to summing amplifier 26 in FIG. 2. The output of summing amplifier 34 is proportional to the aircraft commanded roll acceleration and is applied through terminal 40 to potentiometer 29 in FIG. 2.

Figure 4:
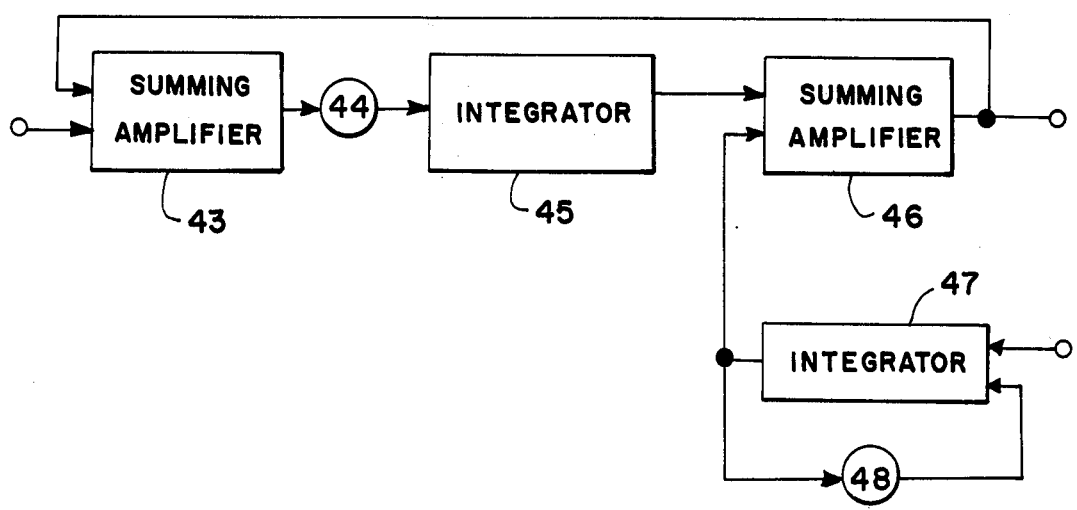
FIG. 4 is a block diagram of the complementary filter disclosed in FIGS. 1 and 2.

A complementary filter suitable for use as filter 12 in FIGS. 1 and 2 is shown in FIG. 4. The output from the rate gyro is applied to a summing amplifier 43 the output of which is applied through a potentiometer 44 to an integrator 45. The output of integrator 45 is applied through a summing amplifier 46 the output of which is connected back to the input of summing amplifier 43. The control signal used to control the aircraft is applied to an integrator 47 which has a feedback potentiometer 48. The output of integrator 47 is applied to summing amplifier 46 the output of which is the aircraft estimated roll rate.

The success of the complementary filter depends on being able to find a single value of r which is both large enough to reject noise on the gyro signal and yet small enough to reject, or washout, long-term errors in the calculated rate. Experience with classical filters in helicopters has shown that filter time constants which are large enough to attenuate noise adequately introduce so much phase lag that additional gains still cannot be achieved without reducing system stability and exciting limit cycle. The typical compromise between noise and limit cycle is usually the selection of a time constant on the order of 0.05 sec. Use of the complementary filter permits use of substantially larger time constant values, which improves noise rejection without encountering limit cycle.

The gains of the four signals summed by summing amplifier 21 are controlled by potentiometers 25, 29, 30 and 32. The gain of the angular acceleration signal from the complementary filter is set by potentiometer 25 to prevent cancellation of the helicopter's inherent roll rate damping. The gain of the estimated roll rate error signal at the output of summing amplifier 26 is set by potentiometer 30 and is usually adjusted in flight to attain the maximum level that can be tolerated from the standpoint of control system noise or limit cycle; the higher the level of gain of potentiometer 30, the better the closed loop system performance. The gain of the actual roll-rate error signal at the output of summing amplifier 28 is set by potentiometer 32 to be equal to the square of the gain of potentiometer 30 divided by four times the square of the desired damping ratio. The damping ratio, for example, can be equal to 0.7.

The advantages of this invention over the prior art is that the complementary filtering technique used provides an estimate of the desired motion parameter that is both free of noise and phase lag. This signal can be used, therefore, to drive the control system on a very high-gain without producing excessive control system noise or exciting control system instability.

What is claimed is:

1. In an aircraft control system in which the outputs from feedback devices including a feedback rate gyro are combined with the pilot input to produce a control signal for actuating the control surfaces of the aircraft, complementary filter means receiving said control signal and the output from said feedback rate gyro for producing an estimated angular rate signal that is free of both noise and phase lag and that is combined with said pilot input to produce said control signal.

2. In an aircraft control system as in claim 1 wherein said complementary filter means includes a simplified model of the aircraft receiving said control signal for producing a signal representing the aircraft's computed response to the control signal, a high-pass filter means receiving said computed response signal for eliminating long-term errors in the signal, a low-pass filter means receiving said output from said feedback rate gyro for eliminating the noise from the signal thereby giving a good estimate of the low frequency content of the motion of the aircraft, and means for summing the outputs of said high-pass and low-pass filters to produce said estimated angular rate signal.

3. In an aircraft control system as in claim 2 wherein the transfer functions of the high-pass filter and the low-pass filter are
$(r_1s/r_1s+1)$ and $(1/r_2s+1)$, respectively, where $r_1$ and $r_2$ are the time constants for the two filters.

4. In an aircraft control system as in claim 3 wherein $r_1$ is equal to $r_2$.

5. In an aircraft control system as in claim 2 including means responsive to the pilot input into the controls of said aircraft for producing a desired rate response signal and means for subtracting said estimated rate signal from said desired rate response signal to produce said control signal.

6. In an aircraft control system as in claim 5 wherein said means for producing a desired rate response signal is a desired response model.

7. In an aircraft control system
means for summing signals to produce a control signal for controlling an aircraft roll rate signal and an aircraft roll acceleration signal in response to the input from the pilot of the aircraft;
a desired response model for producing signals proportional to aircraft roll attitude, aircraft roll rate and aircraft roll acceleration in response to the pilot input;
a vertical gyro attached to the aircraft for producing an aircraft roll attitude signal;
means for obtaining the difference between the aircraft roll attitude signals produced by said desired response model and said vertical gyro and for applying a portion of the difference signal to said means for summing signals to produce a control signal;
a rate gyro attached to the aircraft for producing an aircraft roll rate signal;
a complementary filter means receiving said control signal and the output from said rate gyro for producing an aircraft estimated roll rate signal;
means for applying a portion of said estimated roll rate signal to said means for summing signals to produce a control signal;
means for obtaining the difference between said roll rate signal produced by said desired response model and said estimated roll rate signal to produce an estimated roll rate error signal; and
means for applying a portion of said estimated roll rate error signal to said means for summing signal to produce a control signal.

8. In an aircraft control system according to claim 7 wherein said complementary filter means comprises:
a simplified model of the aircraft receiving said control signal for producing a calculated roll rate signal;
a high-pass filter receiving said calculated roll rate signal for eliminating long-term errors in the signal;
a low-pass filter receiving the roll rate signal from the rate gyro for eliminating the noise from the signal thereby giving a good estimate of the low frequency content of the motion of the aircraft; and
means for summing the outputs of said high-pass and low-pass filters to produce said aircraft estimated roll rate signal.

9. In an aircraft control system according to claim 8 wherein the transfer functions of the high-pass filter and low-pass filter are
$r_1s/r_1s+1$ and $1/r_2s+1$, respectively,
where $r_1$ and $r_2$ are the time constants of the two filters.

10. In an aircraft control system according to claim 9 wherein $r_1$ is equal to $r_2$.

* * * * *